Patented Sept. 12, 1922.

1,428,984

UNITED STATES PATENT OFFICE.

JULIUS SCHMIDLIN, OF BERGEN, NEAR FRANKFORT-ON-THE-MAIN, GERMANY, ASSIGNOR TO LEOPOLD CASSELLA & CO. GESELLSCHAFT MIT BESCHRÄNKTER HAFTUNG, A CORPORATION OF GERMANY.

MANUFACTURE OR PRODUCTION OF CHLORINATED PRODUCTS OF TOLUENE AND DYESTUFFS THEREFROM.

No Drawing.   Application filed March 12, 1915.   Serial No. 13,949.

*To all whom it may concern:*

Be it known that I, JULIUS SCHMIDLIN, professor of chemistry, a citizen of the Swiss Republic, residing at Bergen (Borngasse 7), near Frankfort-on-the-Main, Germany, have invented certain new Improvements in the Manufacture or Production of Chlorinated Products of Toluene and Dyestuffs Therefrom, of which the following is a full description.

I have found that technically pure tetrachlorotoluene may be obtained with a very satisfactory yield by chlorinating in the presence of anhydrous iron chloride or iron, care being taken that the reaction is as homogenous as possible. The tetrachlorotoluene thus produced may be either directly used for technical purposes, or suitably purified for instance by distillation. It can easily and with a very satisfactory yield be converted into tetrachlorobenzalchloride, if contrary to the indications given in Annalen 150 page 304 the chlorination in the side chain of the tetrachlorotoluene is not carried out at the boiling point (280° C.) of the tetrachlorotoluene, but at a considerably lower temperature, preferably between 100° and 130° C. The reaction then runs quite smoothly without the formation of by- and split-products, and is considerably accelerated by the action of light and especially ultraviolet rays.

By heating the tetrachlorobenzalchloride with concentrated sulfuric acid the corresponding tetrachlorobenzaldehyde can be easily produced. This aldehyde has not yet been manufactured and is but vaguely referred to in literature, thus in the Annalen No. 150, page 303 and No. 152, page 245, as follows:—"Tetrachlorobenzaldehyde appears to form when heating tetrachlorobenzalchloride with water to 280° C."

I have further found that new and very valuable dyestuffs of the triphenylmethane series result if this tetrachlorobenzaldehyde is condensed with o-oxycarboxylic acids and the leucocompounds thus produced are then oxidized. These new coloring matters surpass in intensity and fastness other known dyestuffs of a similar character and are distinguished by their bright greenish blue shade.

The invention is illustrated by the following examples:—

Example I: 92 kilos dry toluene are charged with 1 kilo anhydrous chloride of iron. Dry chlorine is passed over the surface of the liquid whilst it is stirred, the temperature being kept at 12° to 15° C. As soon as the thickening of the mass caused by the precipitation of crystallized substance indicates the transformation into trichlorotoluene, the stream of chlorine is interrupted and the mass is completely liquefied by heating to 45° to 50° C. After cooling down to 35° C. chlorine is again introduced, the temperature being raised gradually from 35° to 50° C. so that the continuously stirred mass always remains a comparatively thin liquid. The introduction is interrupted as soon as the weight has reached approximately 220 kilos. A sample diluted with the same volume of carbonbisulfide should at the utmost show traces of precipitated pentachlorotoluene. When distilling, only a small quantity of a primary distillate is obtained, consisting of tetrachlorotoluene $C_6HCl_4.CH_3$ and small quantities of trichlorotoluene. Then about 90% of the theoretical quantity of pure tetrachlorotoluene passes over between 266° and 276° C. After once crystallizing from ether, the substance shows a melting point of 92° C., as indicated in Annalen 150 page 289.

Example II: Tetrachlorotoluene is heated to 100° to 130° C. The liquor is subjected to the action of light, and chlorine is passed slowly into it. As soon as the absorbed quantity of chlorine corresponds to the formation of tetrachlorobenzalchloride, $$C_6HCl_4CHCl_2$$

which is exactly indicated by the increase in weight or volume, or by the specific gravity, the chlorinating process is interrupted. The tetrachlorobenzalchloride is dissolved in about 6 parts strong sulfuric acid, while heating to 90° C. The solution is precipitated by pouring it into ice water and the tetrachlorobenzaldehyde $C_6HCl_4.CHO$ is obtained in the form of a white powder which may be purified by transforming it into the bisulfite compound. If crystallized from ether the aldehyde is obtained in the form of colorless needles having a melting point of 97° to 98° C.

Example III: 24 parts tetrachlorobenzaldehyde and 31 parts o-cresotinic acid are stirred with 150 parts strong sulfuric acid until the aldehyde has disappeared. The leucocompound thus produced of the following graphical formula

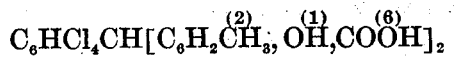

$$C_6HCl_4CH[C_6H_2\overset{(2)}{CH_3}, \overset{(1)}{OH}, \overset{(6)}{COOH}]_2$$

may be directly oxidized to the dyestuff, for instance by adding to it a solution of 7.1 parts dry sodium nitrite in a sufficient quantity of concentrated sulfuric acid and warming the mass to about 90° C. whilst stirring well until the formation of the dyestuff is completed; or the leucocompound may be purified by pouring on to ice, whereby it is precipitated, and then dissolved in dilute soda solution. The impurities are removed by filtration and the leucocompound is precipitated in a pure state by adding mineral acid to this solution. For transformation into dyestuff it is again dissolved in the necessary quantity of concentrated sulfuric acid and oxidized as indicated above by adding sodium nitrite, or in any other suitable manner.

By pouring this solution on to ice the acid of dyestuff is obtained as a brownish red powder, insoluble in water. The powder is soluble in concentrated sulfuric acid with a claret red color, soluble in soda with a yellowish brown color and in caustic soda with an intense blue color. By evaporating the soda solution, the sodium salt separates a reddish brown crystalline powder having the following graphical formula:

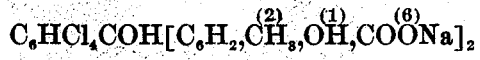

$$C_6HCl_4COH[C_6H_2,\overset{(2)}{CH_3},\overset{(1)}{OH},\overset{(6)}{COONa}]_2$$

In an acid bath wool is dyed fairly intense red or reddish brown shades, depending on the condition of the wool; the afterchromed dyeing shows an intense greenish blue shade.

In the place of o-cresotinic acid other o-oxycarboxylic acids or mixtures thereof may be applied; the tetrachlorobenzaldehyde may further be substituted by tetrachlorobenzalchloride which is previously stirred while heating to 90° C. with strong sulfuric acid and after cooling condensed with o-cresotinic acid. As oxidation agents nitric acid, nitro-compounds, sulfuric acid or oleum may likewise be used.

Having now particularly described and ascertained the nature of my said invention and in what manner the same is to be performed, I declare that what I claim is:—

As a new article of manfacture the new triphenylmethane dyestuff derived from tetrachloro-benzaldehyde and orthocresotinic acid being in a dry state a reddish brown crystalline powder, being in the form of its sodium salt soluble in water with a yellowish brown color, soluble in caustic soda with a deep blue color and in concentrated sulfuric acid with a claret red color, and dyeing wool in an acid bath a red or reddish brown, depending on the condition of the wool, which color, by afterchroming, turns into a beautiful greenish blue shade distinguished by its fastness to washing, milling and potting.

In witness whereof I have hereunto signed my name this 12 day of February 1915, in the presence of two subscribing witnesses.

JULIUS SCHMIDLIN.

Witnesses:
  JEAN GRUND,
  CARL GRUND.